United States Patent [19]

Rozenberg

[11] Patent Number: 5,795,523
[45] Date of Patent: Aug. 18, 1998

[54] METHOD FOR TREATMENT OF $CS_2$ AND $H_2S$ EMISSIONS DURING VISCOSE REGENERATION

[75] Inventor: Alexander Rozenberg, Mogilev, Belarus

[73] Assignee: Alfacel s.a., Madrid, Spain

[21] Appl. No.: 739,825

[22] Filed: Oct. 30, 1996

[51] Int. Cl.$^6$ .................................................. B29C 47/88
[52] U.S. Cl. .......................... 264/196; 264/83; 264/561; 264/562
[58] Field of Search ..................... 264/83, 187, 193, 264/196, 558–562

[56] References Cited

U.S. PATENT DOCUMENTS

| | | |
|---|---|---|
| 604,206 | 6/1898 | Cross et al. |
| 1,036,282 | 8/1912 | Lilienfeld |
| 1,070,776 | 8/1913 | Cohoe et al. |
| 1,158,400 | 10/1915 | Cohoe |
| 1,163,740 | 12/1915 | Cohoe |
| 1,604,686 | 9/1926 | Henderson |
| 1,612,508 | 12/1926 | Henderson et al. |
| 1,645,050 | 11/1927 | Henderson |
| 1,654,253 | 12/1927 | Henderson |
| 1,937,225 | 11/1933 | Hewitt ................................. 264/196 |
| 1,997,349 | 4/1935 | Schwalbe et al. ................... 264/196 |
| 2,043,455 | 6/1936 | Voss et al. ........................... 264/196 |
| 2,925,621 | 2/1960 | Parth ................................... 264/196 |
| 2,999,756 | 9/1961 | Shiner et al. ........................ 99/176 |
| 2,999,757 | 9/1961 | Shiner et al. ........................ 99/176 |
| 3,044,115 | 7/1962 | Craver et al. ....................... 264/196 |
| 3,835,113 | 9/1974 | Burke et al. ........................ 260/216 |
| 4,317,794 | 3/1982 | Gord et al. ......................... 264/558 |
| 4,590,107 | 5/1986 | Bridgeford ......................... 428/36 |
| 4,778,639 | 10/1988 | Jon et al. ........................... 264/190 |
| 4,781,931 | 11/1988 | Jon et al. ........................... 426/132 |
| 5,358,765 | 10/1994 | Markulin ............................ 428/34.8 |
| 5,470,519 | 11/1995 | Markulin ............................ 264/193 |

*Primary Examiner*—Jan H. Silbaugh
*Assistant Examiner*—Mark Eashoo
*Attorney, Agent, or Firm*—Marshall, O'Toole, Gerstein, Murray & Borun

[57] ABSTRACT

The present invention relates to an improved method for producing tubular sausage casings of regenerated cellulose wherein viscose is extruded through an annular extrusion die submerged in an aquarium to form a tubular product and coagulation and regeneration of the tubular product is initiated in said aquarium, continued by spray application of an intermediate regenerating solution in an intermediate regeneration zone after the tubular product has exited the aquarium, and completed in one or more coagulation/regeneration baths which includes the step of heating the tubular product to a temperature above the boiling point of carbon bisulphide in the intermediate reaction zone.

6 Claims, 1 Drawing Sheet

METHOD FOR TREATMENT OF CS₂ AND H₂S EMISSIONS DURING VISCOSE REGENERATION

BACKGROUND OF THE INVENTION

The present invention relates to provision of a new, unique regeneration method for the production of tubular non-fibrous, non-reinforced, regenerated cellulosic casings, normally referred to as skinless sausage casing. Specifically, the method provides improvements in the prevention and reduction of airborne emissions of carbon bisulphide ($CS_2$) and hydrogen sulphide ($H_2S$) which gases are produced during the regeneration of viscose to produce a cellulosic casing.

Tubular cellulosic casing is well-known and has been widely used for many years by numerous manufacturers. The basic process for manufacturing regenerated cellulosic casings is through the well-known viscose process which creates a liquified colloidal dispersion of cellulose fibers in an alkaline liquid carrier. Viscose is described in English Patent 8700, Cross, Bevan and Beadle. Patents such as U.S. Pat. No. 1,036,282 to Lilienfield redefine the compositions. U.S. Pat. No. 1,070,776; U.S. Pat. No. 1,158,400; U.S. Pat. No. 1,163,740 to Cohoe and Fox describe use of viscose to manufacture a tubular cellulosic casing. Henderson provides basic technology to manufacture viscose into tubular casings with regenerating baths touching the inner and outer surfaces of the tube: U.S. Pat. No. 1,601,686; U.S. Pat. No. 1,612,508; U.S. Pat. No. 1,645,050 and U.S. Pat. No. 1,654,253.

Specific details for manufacture of modern day casings from viscose into regenerated cellulose are well known in the art and are described in references such as U.S. Pat. No. 2,999,756 and 2,999,757 to Shiner; U.S. Pat. No. 3,835,113 to Burke; U.S. Pat. No. 4,590,107 to Bridgeford; U.S. Pat. No. 4,778,639 to Jon; and U.S. Pat. No. 5,358,765 to Markulin. These references describe the basic process of extruding viscose (sodium cellulose xanthate, sodium hydroxide, water) through an annular die into a coagulating and regenerating bath which regenerates the extruded viscose to produce a cellulosic tubular casing.

It is during the regeneration of extruded viscose to a cellulosic casing material that carbon bisulphide ($CS_2$) and hydrogen sulphide ($H_2S$) are produced. Because these gases are toxic and subject to health and environmental regulation they must be removed from the process exhaust gases. Various methods are known in the art for removal of $CS_2$ and $H_2S$ from exhaust gases but their economic efficiency is directly dependent upon the concentrations of the gases to be removed. In particular, it is desired that the concentration of $CS_2$ in a gas to be scrubbed be greater than 1.5 g/m³ for the sake of economy.

Two general methods for the removal of carbon bisulphide and hydrogen sulphide from ventilation gases are well known in the art. According to the first method $H_2S$ is oxidized to form non-bound sulphur ($S_2$), followed by sorbing of $CS_2$ by means of activated carbon. The sorbed $CS_2$ is then desorbed from the carbon bed by means of vapor and recycled for use in the production of fibers and films. According to the second method $H_2S$ and $CS_2$ are burned in the presence of a catalyst, thus forming $CO_2$, $H_2O$, and $SO_2$ followed by neutralization of $SO_2$ by means of alkali solutions.

The efficiency and economy of both the above methods is dependent upon maximizing the concentration of the $H_2S$ and $CS_2$ in the exhaust gas stream. Thus, for the first method, the sorbing reaction of CS2 by means of activated carbon can be illustrated by the following equation:

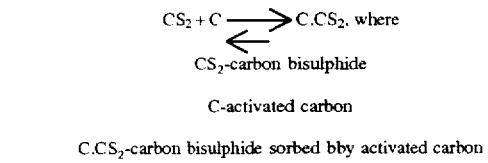

C-activated carbon

C.CS₂-carbon bisulphide sorbed bby activated carbon

The reaction velocity constant (K) is to be represented by the following:

$$K = \frac{Cc.cs_2}{Ccs_2.Cc},$$

where

Cc.cs₂—concentration of carbon bisulphide sorbed by activated carbon Ccs₂—concentration of carbon bisulphide in gas-air mixture Cc—concentration of carbon in adsorber As the concentration of carbon in adsorber is a constant value, and is infinitely high in relation to the concentration of carbon bisulphide in the gas-air mixture, as well as to the concentration of sorbed hydrogen, then the value may be excluded from the equation, and the equation is to be represented as follows:

$$K = \frac{Cc.cs_2}{Ccs_2},$$

Thus, the higher the concentration of carbon bisulphide in the gas-air mixture, the higher is the concentration of sorbed carbon bisulphide in carbon prior to the state of dynamic balance and the more continuous is the sorbing cycle.

According to a typical commercial system such as available from Lurgi Systems (Germany) having an adsorption bed loaded with 18 tons of carbon, and with a $CS_2$ concentration of 1.5 g/m³ the sorbing cycle takes roughly 8 hours until breakthrough of $CS_2$. With a $CS_2$ concentration of only 1.0 g/m³ the efficient sorbing cycle is decreased up to 1.5–2 hours to only 6–6.5 hours which is commercially inefficient.

According to the second method involving the incineration of $H_2S$ and $CS_2$ the lower the concentration of $H_2S$ and $CS_2$ the higher the specific consumption of fuel. Accordingly, with a decrease of $H_2S$ and $CS_2$ concentration, the expense of gas purification sharply increases. Thus, there remains a desire in the art for viscose regeneration methods which maximize the concentration of $CS_2$ in gas-air mixture exhausted from the regeneration process.

SUMMARY OF THE INVENTION

The present invention provides an improved method for producing tubular sausage casings of regenerated cellulose such that the concentration of $CS_2$ and $H_2S$ in the exhaust gases are maximized. Specifically, the invention provides improvements to methods wherein viscose is extruded through an annular extrusion die submerged in an aquarium to form a tubular product and coagulation and regeneration of the tubular product is initiated in said aquarium, continued by spray application of an intermediate regenerating solution in an intermediate regeneration zone after the tubular product has exited the aquarium, and completed in one or more coagulation/regeneration baths, the improvement comprising heating the tubular product to a temperature above the boiling point of carbon bisulphide in the intermediate regeneration zone. The boiling point of carbon bisulphide at atmospheric pressure is 46.5° C. Thus, the regenerating viscose may be heated by application of heated vapor which is unsaturated with respect to $CS_2$ and $H_2S$, hot regeneration solution or other means including radiative heat and direct heating such as through heated rollers to maximize the vaporization of $CS_2$ and $H_2S$. The $CS_2$ and $H_2S$ containing vapor may then be scrubbed or vaporized according to conventional methods, but with greater efficiency than previously provided.

According to a preferred method of the invention, heating is carried out by means of application of vapor unsaturated with respect to $CS_2$ nd $H_2S$ such as at elevated temperature and pressure to the intermediate egeneration zone. According to one preferred method of the invention, unsaturated vapor is applied at a temperature of 180° C. and 2 atmospheres (gauge). Such excess temperature and pressure above the dew point of $CS_2$ and $H_2S$ assures that those gases do not condense upon contact with the casing and regeneration bath. Alternatively or in combination with the application of hot vapor, hot intermediate regeneration solution may also be applied to the regenerating viscose in the intermediate regeneration zone. Preferably, such a hot solution is characterized by a sulfate ion concentration of over 60 g/L. According to preferred methods the concentration of $CS_2$ in the intermediate regeneration zone is 1.5 g/m³ or greater. According to another embodiment of the invention, transporting rollers may be provided downstream of the intermediate regeneration zone in order to condense any remaining $CS_2$ gas and deflate the casing to a flat profile prior to its being conveyed to a finishing machine.

DETAILED DESCRIPTION OF THE INVENTION

Figure 1:
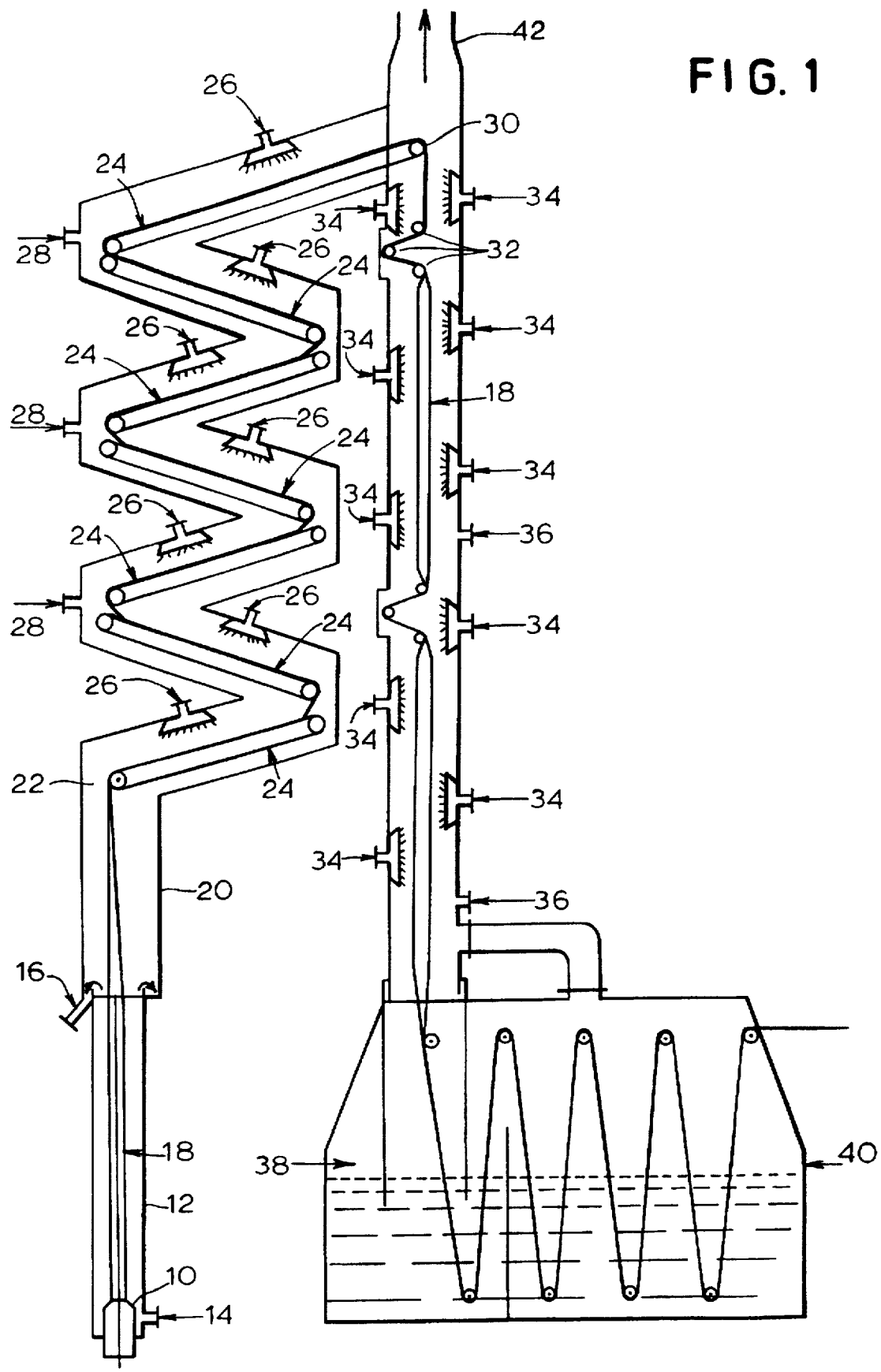
FIG. 1 depicts a generalized casing regeneration apparatus according to the invention.

The methods of the invention may be applied to any viscose regeneration system performing an intermediate regeneration step between extrusion from an annular extrusion die submerged in an aquarium and completion of regeneration in one or more coagulation/regeneration baths. It is preferred that such intermediate phases last not less than 35 seconds in duration. Regeneration of viscose to cellulose, including regeneration after exiting from an aquarium and prior to entering a coagulation/regeneration bath is characterized by the generation of carbon bisulphide ($CS_2$) and hydrogen sulphide ($H_2S$). The present invention provides methods for increasing the concentration of $CS_2$ and $H_2S$ in the intermediate regeneration zone in order that these off-gases may be more efficiently recycled or disposed of. Preferably, the concentration of $CS_2$ is increased to 1.5 g/m³ or greater by means of heating in the intermediate regeneration zone.

By "intermediate regeneration zone" is meant that region subsequent to the viscose casing exiting from the aquarium in which it is initially extruded and prior to a coagulation/regeneration bath that substantially completes regeneration. The intermediate regeneration zone may itself comprise multiple zones or areas in which a casing exiting the aquarium takes initial form and structure. Typically, the zone involves rollers, belts or other conveying devices which transport the regenerating viscose casing from the aquarium to the first of several coagulation/regeneration baths. The use of rollers including a premier roller, top roller and other intermediate rollers to convey the regenerating viscose is well known to those of skill in the art. Alternatively, inclined belts such as disclosed in co-owned and copending U.S. application Ser. No. 08/703,888 filed Aug. 27, 1996 the disclosure of which is hereby incorporated by reference may be used in combination with rollers to convey the regenerating viscose through the intermediate regeneration zone.

Within the intermediate regeneration zone, intermediate regeneration solution comprising concentrations of $H_2SO_4$ and $Na_2SO_4$, lower than those typically used in the aquarium regenerating bath are applied to the viscose casing. The intermediate regenerating solution is preferably applied by spraying but other means are also contemplated according to the invention.

While prior art methods for applying intermediate regenerating solution typically do so at "cool" temperatures of from 30° C. to 50° C. it is preferred according to the present invention that the intermediate regenerating solution be applied at elevated temperatures such that the regenerating viscose tubular product is brought to a temperature above the boiling point of $CS_2$ (46.5° C. at atmospheric pressure). Accordingly, the application of intermediate regeneration solution at temperatures of about 95° C. to about 97° C. is particularly preferred.

In addition to the application of hot intermediate regeneration solution to heat the viscose tubing, hot unsaturated vapor may also be used to heat the viscose and vaporize the $CS_2$ and $H_2S$ in the intermediate regeneration zone.

In addition, other means for heating of the regenerating viscose would be apparent to those of ordinary skill in the art upon consideration of the disclosure. Such means would include radiative heating with infra-red or other radiation and conductive and convective heating.

According to one embodiment of the invention regenerating viscose is conveyed through two intermediate regeneration zones. In the first zone the casing is sprayed on one side with a first intermediate regeneration solution comprising 140 g/L $H_2SO_4$ and 200 g/L $Na_2SO_4$ at a temperature of 30° C. while contacted on the other side by hot unsaturated vapor at a temperature of 180° C. at two atmospheres (gauge). The casing is then conveyed to a second intermediate regeneration zone where it is contacted with a second intermediate regeneration solution comprising 20 g/L $H_2SO_4$ and 300 g/L $Na_2SO_4$ at a temperature of 95° C. to 97° C. and contacted with hot unsaturated vapor at a temperature of 180° C. at two atmospheres (gauge).

According to one embodiment of the invention the same solution of sulfuric acid and sodium sulfate which is circulated in the first coagulation/regeneration ("finishing") bath is supplied to the second intermediate regeneration zone, and with the same temperature.

The method of the invention not only increases the carbon bisulphide concentration in gas-air mixture to over 1.5 g/m³, but also intensifies the finishing process. Specifically, the methods of the invention are so efficient at removing $CS_2$ that casings transferred to the second finishing bath are typically substantially free of cellulose-bound carbon bisulphide.

The methods of the invention wherein the regenerating viscose is subjected to elevated temperatures in the intermediate regeneration zone by means of hot unsaturated vapor but without simultaneous application of an intermediate regeneration solution leads to the undesirable accumulation of water in the first casing branch in the first finishing/regeneration bath as a consequence of water diffusion into the casing due to an elevated concentration of sulfate ions inside the casing. In such a case, the casing must either be punctured frequently to drain the accumulated liquid, or the liquid must be transferred manually to the second or third branch in the first finishing/regeneration bath zone. This, however, leads to a loss of vapor tightness of the first finishing bath, and penetration of carbon bisulphide and hydrogen sulphide into the operation zone. In general, where the sulfate ion concentration of regeneration solutions applied to the outside of a casing is less than 60 g/L there results an undesirable water accumulation within the casing.

As a further aspect of the invention, it is desired to cool the casing above the first finishing/regeneration bath in order to prevent inflation of the casing due to the evolved carbon bisulphide and hydrogen sulphide. Such inflation of the casing is undesirable because it disturbs the casing moving in the finishing machine. According to one preferred method, cooling fluid, such as water is circulated through a roller to cool the casing passing over the roller. The casing, is then cooled and immediately flattens due to condensation of the carbon bisulphide.

FIG. 1 presents a general depiction of an apparatus useful for practice of the methods of the invention. In this system, the viscose casing is extruded through die orifice (10) in aquarium (12) having regeneration bath inlet (14) and regeneration bath outlet (16) to produce tubular casing (18). The partially regenerated viscose casing (18) is conveyed vertically into enclosure (20) where it initially contacts premier roll (22) and multiple inclined conveyor belts (24) such as those disclosed in co-owned and copending U.S. application Ser. No. 08/703,888 filed Aug. 27, 1996 the disclosure of which is hereby incorporated by reference. The inclined conveyor belts (24) convey the regenerating viscose vertically while a first hot intermediate regeneration solution is sprayed onto the belts by means of spray nozzles (26). Simultaneously, hot unsaturated vapor is admitted to the upward conveying portion of the intermediate regeneration zone through inlets (28).

Upon reaching to top roll (30) the casing is conveyed downwardly on multiple rollers (32) and is sprayed with a second hot intermediate regeneration solution through spray nozzles (34). Simultaneously, hot unsaturated vapor is admitted to the downwardly conveying portion of the intermediate regeneration zone through inlets (36). The casing is then conveyed into a first coagulation/regeneration (finishing) bath (38) and from there into a second coagulation/regeneration (finishing) bath (40). The air/gas mixture including the emitted $CS_2$ and $H_2S$ is discharged out of exhaust port (42) from which it is conveyed to conventional scrubbing, recovery and/or incineration apparatus.

Other aspects and advantages of the present invention will be understood upon consideration of the following illustrative and comparative examples which report the results of pilot plant studies utilizing a regeneration speed of 12 meters/minute, the data being extrapolated to the speed of 40 meters/minute. The concentration of the emitted gases was 8.3 g/cubic meter.

EXAMPLE 1

According to this example, viscose casing was produced by means of viscose extrusion from extrusion die (10) into the initial regeneration bath within aquarium (12) depicted in FIG. 1. The casing was then transferred to the upward conveying portion of the intermediate regeneration zone where the casing from the one side was sprayed with a first intermediate regeneration solution comprising 140 g/L of sulfuric acid and 250 g/L of sodium sulfate through nozzles (26). The casing was also heated on its other side with hot unsaturated vapor being supplied into the first zone.

From the upward conveying portion of the intermediate regeneration zone the casing was transferred to the downward conveying portion of the intermediate regeneration zone, where it was sprayed with a second intermediate regeneration solution from nozzles (34) with a temperature of 95°–97° C. comprising 20 g/L $H_2SO_4$ and 300 g/L $Na_2SO_4$ for a $SO_4$ concentration of 222 g/L. The casing was also heated with hot unsaturated vapor supplied through inlets (36) at a temperature of 180° C. at two atmospheres (gauge). The casing was then transferred into the first finishing bath (38) in which the same solution comprising 20 g/L $H_2SO_4$ and 200 g/L $Na_2SO_4$ was being circulated at 95°–97° C.

The produced gas-air mixture in the intermediate regeneration zone, as well as in the first finishing bath was to be removed from the apparatus through exhaust (42) by means of a ventilator, and transferred to gas purification.

After 4 hours of continuous operation, there was virtually no liquid accumulated in the first casing branch in the first finishing/regeneration bath as well as in the casing present in the first coagulation/regeneration bath (38). After the treatment in the first coagulation/regeneration bath (38), the casing was substantially free of carbon bisulphide.

EXAMPLE 2

According to this example, the regeneration process was run under the same conditions as set out in Example 1 but wherein the intermediate regeneration solution sprayed through nozzles (34) in the downward leg of the intermediate regeneration zone comprised of 20 g/L $H_2SO_4$ and 45 g/L $Na_2SO_4$ for a $SO_4$ concentration of 49 g/L. After 20 minutes of operation according to these parameters liquid accumulation inside the first branch of casing, and in the first coagulation/regeneration reached critical levels.

EXAMPLE 3

According to this example, the regeneration process was run under the same conditions as set out in Example 1 but wherein the intermediate regeneration solution sprayed through nozzles (34) in the downward leg of the intermediate regeneration zone comprised of 20 g/L $H_2SO_4$ and 62 g/L $Na_2SO_4$ for a $SO_4$ concentration of 62 g/L. After 2 hours and 20 minutes of operation according to these parameters liquid accumulation inside the first branch of casing, and in the first coagulation/regeneration reached critical levels.

After treatment in the first coagulation/regeneration bath, the casing was substantially free of cellulose-bound carbon bisulphide. The casing was then washed off with water, plasticized with glycerol, dried off, and shirred in accordance with conventional production technology.

The surface physical and mechanical data of the two casing samples produced by the same technology process (with the exception that in the first case the casing after the molding operations was not treated with high temperatures in zones I and II, as well as in the first finishing bath; and in the second case the casing was treated by means of the above-mentioned method) have vividly shown that the parameters of strength, lengthening and double bending of both of the samples have been on the same level. The results of mechanical testing are set out in Table 1 below wherein "Std. Casing" indicates a casing produced according to prior art methods while "Exp. Casing" relates to a casing produced according to the methods of the invention.

TABLE 1

|  | Longitudinal Direction | | | | Sectional Direction | | | |
|---|---|---|---|---|---|---|---|---|
|  | Std. Casing | | Exp. Casing | | Std. Casing | | Exp. Casing | |
|  | Dry | Wet | Dry | Wet | Dry | Wet | Dry | Wet |
| Strength, kg/mm2 | 7.8 | 3.9 | 7.9 | 3.9 | 6.7 | 3.8 | 6.5 | 3.5 |
| Stretching, % % | 54 | 72 | 58 | 72 | 62 | 84 | 68 | 78 |
| Glycerol, % % | 18.2 | — | 18.6 | — | 18.5 | — | 18.5 | — |
| Moisture, % % | 10.4 | — | 11.8 | — | 10.4 | — | 11.6 | — |
| Double bend cycle | 9864 | — | 10128 | — | 10244 | — | 11500 | — |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. In a method for producing tubular sausage casings of regenerated cellulose wherein viscose is extruded through an annular extrusion die submerged in an aquarium to form a tubular product and coagulation and regeneration of the tubular product is initiated in said aquarium, continued by spray application of an intermediate regenerating solution in an intermediate regeneration zone after the tubular product has exited the aquarium, and completed in one or more coagulation/regeneration baths, the improvement comprising:

heating the tubular product to a temperature above the boiling point of carbon bisulphide in the intermediate regeneration zone to maximize concentration of the carbon bisulphide in a gas/air mixture exhausted from the intermediate regeneration zone for more efficient recycling or disposal.

2. The method according to claim 1 wherein the heating is carried out by means of application of hot vapor which is unsaturated with respect to carbon bisulphide to the intermediate regeneration zone.

3. The method according to claim 1 wherein hot intermediate regeneration solution at a temperature of from 95° C. to 97° C. is applied to the regenerating viscose in the intermediate regeneration zone.

4. The method according to claim 3 wherein the intermediate regeneration solution is characterized by a sulfate ion concentration of greater than 60 g/L.

5. The method according to claim 1 further including the steps of:

condensing any remaining carbon bisulphide gas downstream of the intermediate regeneration zone by contacting said tubular product with cooled transporting rollers; and deflating the casing to a flat profile prior to its being conveyed to a finishing machine.

6. The method according to claim 1 wherein the concentration of carbon bisulphide in the intermediate regeneration zone is 1.5 g/m$^3$ or greater.

* * * * *

UNITED STATES PATENT AND TRADEMARK OFFICE
CERTIFICATE OF CORRECTION

PATENT NO. : 5,795,523
DATED : August 18, 1998
INVENTOR(S) : Alexander Rozenberg It is certified that error appears in the above-identified patent and that said Letters Patent is hereby corrected as shown below:

Title page, item [56]

U.S. Patent Documents: Before "...Henderson", delete "1,604,686" and insert -- 1,601,686--

U.S. Patent Documents: Before "...Henderson", delete "11/1927" and insert -- 10/1927--

Col. 2, line 9: After "...bisulphide sorbed", delete "bby" and insert -- by --.

Col. 3, line 12: After "...to the intermediate", delete "egeneration" and insert -- regeneration--.

Signed and Sealed this

First Day of August, 2000

*Attest:*

*Attesting Officer*

Q. TODD DICKINSON

*Director of Patents and Trademarks*